United States Patent [19]

Sato et al.

[11] Patent Number: 4,760,406
[45] Date of Patent: Jul. 26, 1988

[54] LASER PRINTER INTERFACE CIRCUIT

[75] Inventors: Tsutomu Sato, Yokohama; Noboru Murayama, Machida; Hiroshi Shimura, Kawasaki, all of Japan

[73] Assignee: Ricoh Company, Ltd., Tokyo, Japan

[21] Appl. No.: 837,542

[22] Filed: Mar. 7, 1986

[30] Foreign Application Priority Data

Mar. 7, 1985 [JP] Japan .................................. 60-45620

[51] Int. Cl.$^4$ .......................... G01D 9/00; H04N 1/21; G06F 9/00; H04Q 9/00
[52] U.S. Cl. .................. 346/33 R; 346/76 L; 346/108; 358/296; 364/900; 340/825.14
[58] Field of Search ................ 346/76 L, 33 R, 108; 358/296; 364/900; 340/825.14

[56] References Cited

U.S. PATENT DOCUMENTS 3,638,197 1/1972 Brennan, Jr. et al. ........... 340/172.5
4,561,024 12/1985 Tamura ............................. 358/287

Primary Examiner—E. A. Goldberg
Assistant Examiner—Gerald E. Preston
Attorney, Agent, or Firm—Cooper & Dunham

[57] ABSTRACT

A printer interface circuit is provided in a host system so as to allow a printer having its own clock signal for its printing operation to be directly connected to the host system. In the present invention, data to be printed is first stored in a data latch as supplied in association with the clock signal of the host system, and then the data stored in the data latch is transferred to the printer in association with the printer. Thus, even if use is made of a laser printer, which has its own clock signal, it can be directly connected to a host system, such as a personal computer. In the preferred embodiment, the printer interface circuit modifies the frequency of the clock signal of the printer and the data is transferred to the printer at this modified frequency, so that the data may be expanded when printed.

8 Claims, 6 Drawing Sheets

| FIG.4a | FIG.4b |

LASER PRINTER INTERFACE CIRCUIT

BACKGROUND OF THE INVENTION

1. Field of the Invention

This invention relates to a printer control circuit for controlling the operation of various types of printers, such as laser printer, thermal printer, wire-dot printer, and ink-jet printer, and, in particular, to a printer interface circuit embodied in a host system.

2. Description of the Prior Art

FIG. 1 shows a typical prior art system including a host device 1, such as a personal computer, a printer controller 2 and a laser printer 3. When the laser printer 3 is used as an output device, since it cannot be directly connected to the host device 1, there must be provided the printer controller 2 which generally includes a CPU, bit map memory, and a character generator. This is because, the laser printer 3 has its own clock signal for its operation and this clock signal must be synchronized with the supply of print data supplied thereto. Since the host device 1 normally has its own clock signal and the transmission of data to be printed is not in synchronism with the clock signal of the laser printer 3, the laser printer 3 cannot be directly hooked to the host devicel. Thus, the printer controller 2 is provided between the host device 1 and the laser printer 3, whereby the data to be printed is first transferred into the bit map memory of the printer controller 2, from where the data to be printed is transferred to the laser printer 3 in synchronism with the clock signal generated at the laser printer.

The laser printer 3 is very fast in operation and high in resolution and it provides a plain paper output, so that it is desirous to use the laser printer 3 as an output device of various systems, such as personal computers and wordprocessors. However, since the laser printer 3 requires the provision of the printer controller 2 separately, it tends to push up the cost.

SUMMARY OF THE INVENTION

In accordance with the present invention, there is provided a printer control interface circuit which is provided, for example, in the form of an interface board in a host system, so that a printer, such as a laser printer, can be connected to the printer system directly. In particular, if the printer supplies its own clock signal, as in the case of a laser printer, the data to be printed is once stored in a temporary memory, such RAM, provided in the host system and then the data is transferred to the printer in accordance with the clock signal supplied from the printer. In the preferred embodiment, the printer interface circuit includes an expansion circuit comprised of a frequency divider, so that expansion circuit converts the time period of the clock signal from the printer into an integral multiple of the time period. Since the clock signal of the printer is used to sweep along the print line, this has an effect of expanding the horizontal line by the amount of an integral multiple. At the same time, the host system stores a program which serves to repeat the data for a single print line over the number of times corresponding to the integral multiple. As a result, the data stored in the bit map memory of the host system is printed as expanded horizontally as well as vertically. This is advantageous because the bit map memory of the host system does not need to be large in capacity.

It is therefore a primary object of the present invention to obviate the disadvantages of the prior art as described above and to provide an improved printer interface circuit.

Another object of the present invention is to provide a printer control system compact in size and low at cost.

A further object of the present invention is to provide a board-type laser printer interface circuit which may be provided in a host system thereby allowing a laser printer to be directly connected to the host system.

A still further object of the present invention is to provide a printer system fast in operation.

Other objects, advantages and novel features of the present invention will become apparent from the following detailed description of the invention when considered in conjunction with the accompanying drawings.

DESCRIPTION OF THE PREFERRED EMBODIMENTS

Figure 1:
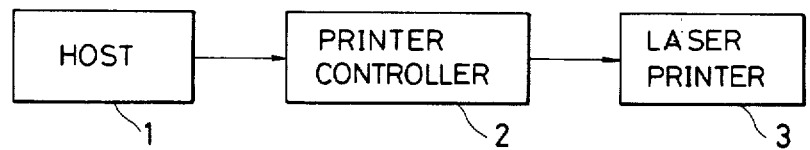
FIG. 1 is a block diagram showing the overall structure of a prior art system using a laser printer.
Figure 2:
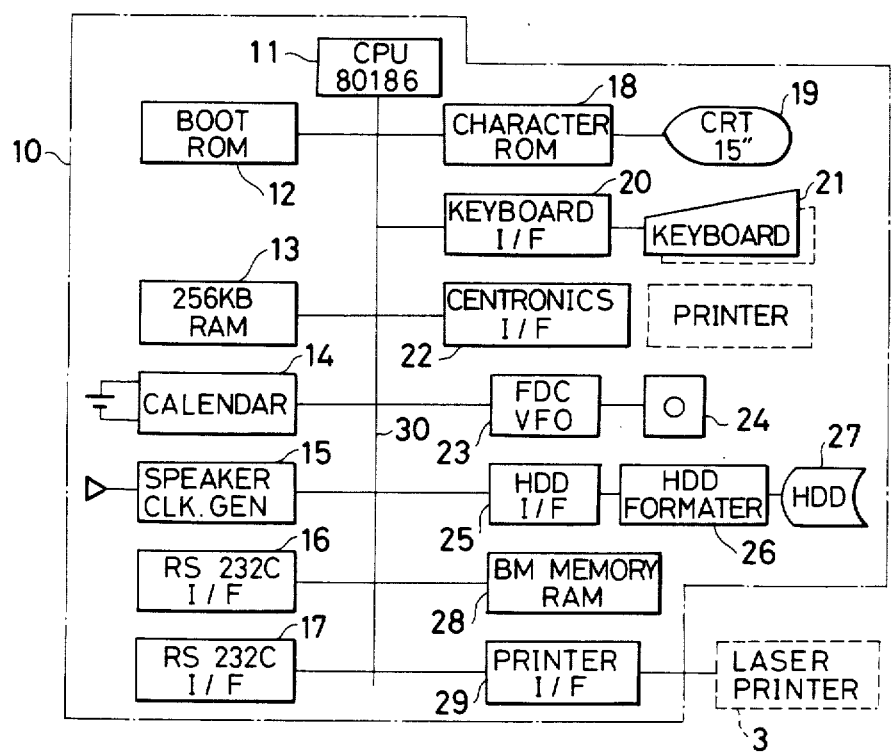
FIG. 2 is a block diagram showing the overall structure of a host system including a printer interface circuit 29 constructed in accordance with one embodiment of the present invention thereby allowing a laser printer to be directly connected thereto.

Referring now to FIG. 2, there is shown in block form a host system or computer system 10, such as a personal computer, constructed in accordance with one embodiment of the present invention. As shown, the host system 10 includes a central processing unit or simply CPU (80186 in the illustrated example), a boot ROM 12, 256 KB RAM 13, calender 14, speaker 15, a pair of serial interfaces 16 and 17, character ROM 18, CRT 19, keyboard interface 20, keyboard 21, parallel interface 22, floppy disc controller 23, floppy disc drive 24, hard disc drive interface 25, hard disc drive formatter 26, hard disc drive 27, and bit map memory RAM 28. It is to be noted that each of these elements shown in the form of blocks in the host system 10 is well known in the art and thus the detailed explanation for each element will not be given here. These elements are interconnected by a bus interconnection system 30. In accordance with the principle of the present invention, also provided in the host system 10 is a printer interface 29 which is also connected to the system bus 30. The host system 10 is then connected to a laser printer 3 through the printer interface 29. Accordingly, the data in the bit map memory RAM 28 may be directly transferred to the laser printer 3 through the printer interface 29.

Although a laser printer itself is also well known in the art, the functional characteristics of the laser printer 3 will be described below. The laser printer 3 in the illustrated embodiment is assumed to use A4-sized sheets of plain paper and the laser printer 3 acts as a page printer in a sense that it prints data on A4-sized sheets of paper page by page, so that once printing operation is initiated, it proceeds continuously at least until the printing operation of a single page is completed. Thus, when use is made of a laser printer, it normally requires to provide a bit map memory having the capacity corresponding to the full print area of a single sheet of paper.

Figure 3:
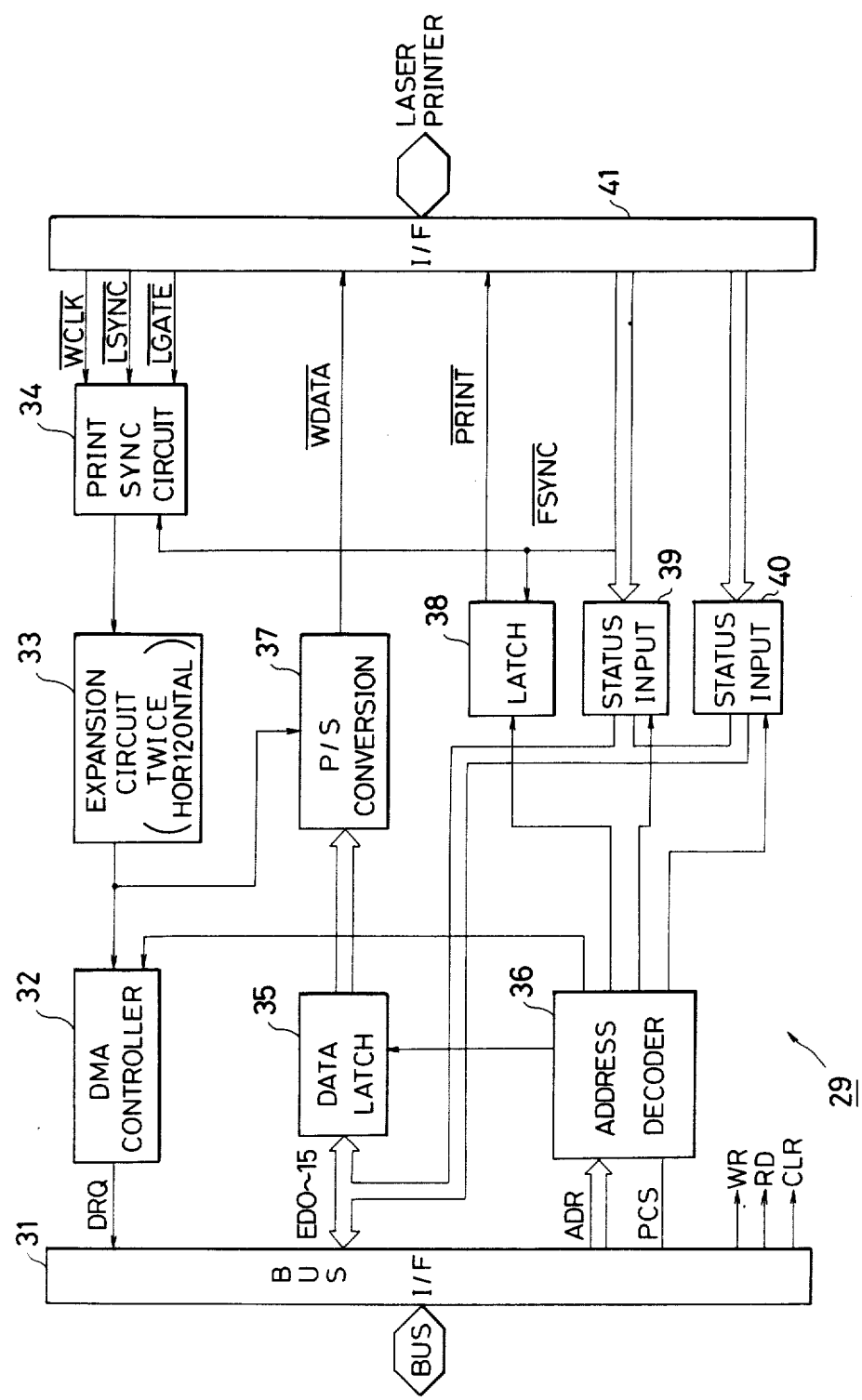
FIG. 3 is block diagram showing the overall structure of the printer interface circuit 29 shown in FIG. 2.

FIG. 3 shows the detailed structure of the printer interface circuit 29 provided in the host system 10 shown in FIG. 2. As shown, the printer interface circuit 29 includes a bus interface 31 which is connected to the system bus 30 of the host system 10. The bus interface 31 is connected to receive a DMA request signal DRQ from a direct memory access (DMA) controller 32. The bus interface 31 is connected to a data latch 35 and also to a pair of status inputs 39 and 40 through a 16-bit bus. An address signal ADR and a print command signal PCS are supplied from the bus interface 31 to an address decoder 36, which is operatively connected to the DMA controller 32, data latch 35 and also to a latch 38 and to the pair of status inputs 39 and 40. Connected to the data latch 35 to receive data therefrom is a parallel-to-serial shift register 37, which is also connected to receive a control signal from an expansion circuit 33, which expands the data twice in the horizontal direction in the illustrated embodiment as will be described more in detail later. The expansion circuit 33 is also connected to supply its control signal to the DMA controller 32 and it is connected to a print sync circuit 34. The printer interface circuit 29 also includes an interface 41 which interfaces with the laser printer 3. Through the interface 41, several command signals are supplied from the laser printer 3 to the printer interface circuit 29 and they include a laser clock signal $\overline{WCLK}$, whose one clock pulse corresponds to one dot of print information, line sync singal $\overline{LSYNC}$, and page sync signal $\overline{LGATE}$. These signals are supplied to the print sync circuit 34, which controls the operation of the expansion circuit 33 and the DMA controller 32 in accordance with these singals, thereby controlling the supply of print data through the data latch 35 and the P/S converter 37. Print data $\overline{WDATA}$ is thus serially issued from the P/S converrer 37 and supplied to the laser printer 3 for printing. A print signal $\overline{PRINT}$ is issued from the latch 38 and supplied to the laser printer 3 through the interface 41.

In operation, when the print command signal PCS is supplied from the host system 10 to the printer interface circuit 29, it supplies the print signal PRINT the laser printer 3. Then, in accordance with various sync signals, such as $\overline{WCLK}$, $\overline{LSYNC}$, $\overline{LGATE}$, AND $\overline{FSYNC}$, supplied from the laser printer 3, the DMA request signal DRQ is supplied from the printer interface circuit 29 to the host system 10, thereby requesting the host system 10 to transfer print data to the printer interface circuit 29. Then, a word of print data is transferred to the data latch 35 of the printer interface circuit 29 from the host system 10 by DMA operation. The print data thus supplied is then transferred to the laser printer 3 through the P/S converter 37 in synchronism with the laser clock signal $\overline{WCLK}$ as modified by the expansion circuit 33. Thus, when the print data in the data latch 35 is converted into a serial data by the P/S converter 37, the data is expanded by the factor of n (twice in the illustrated embodiment), where n is a real number.

Figures 4, 4A:
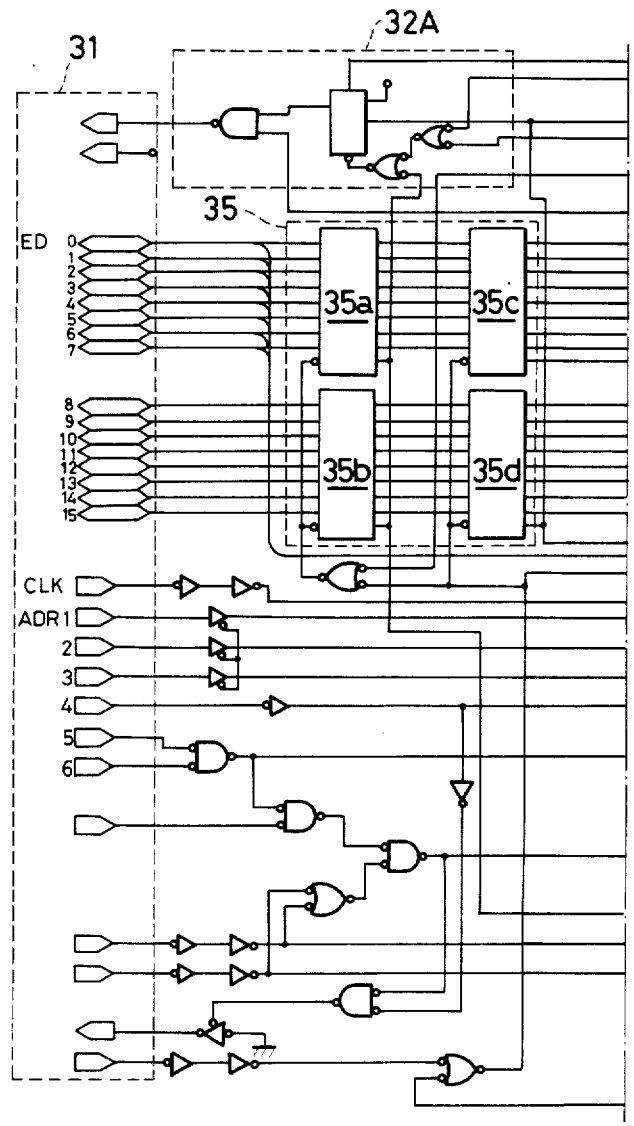
FIG. 4 is a schematic illustration showing how FIGS. 4a and 4b to be arranged.
FIGS. 4a and 4b, when combined as indicated in FIG. 4, show the detailed structure of the printer interface circuit of FIG. 3.
Figure 4B:
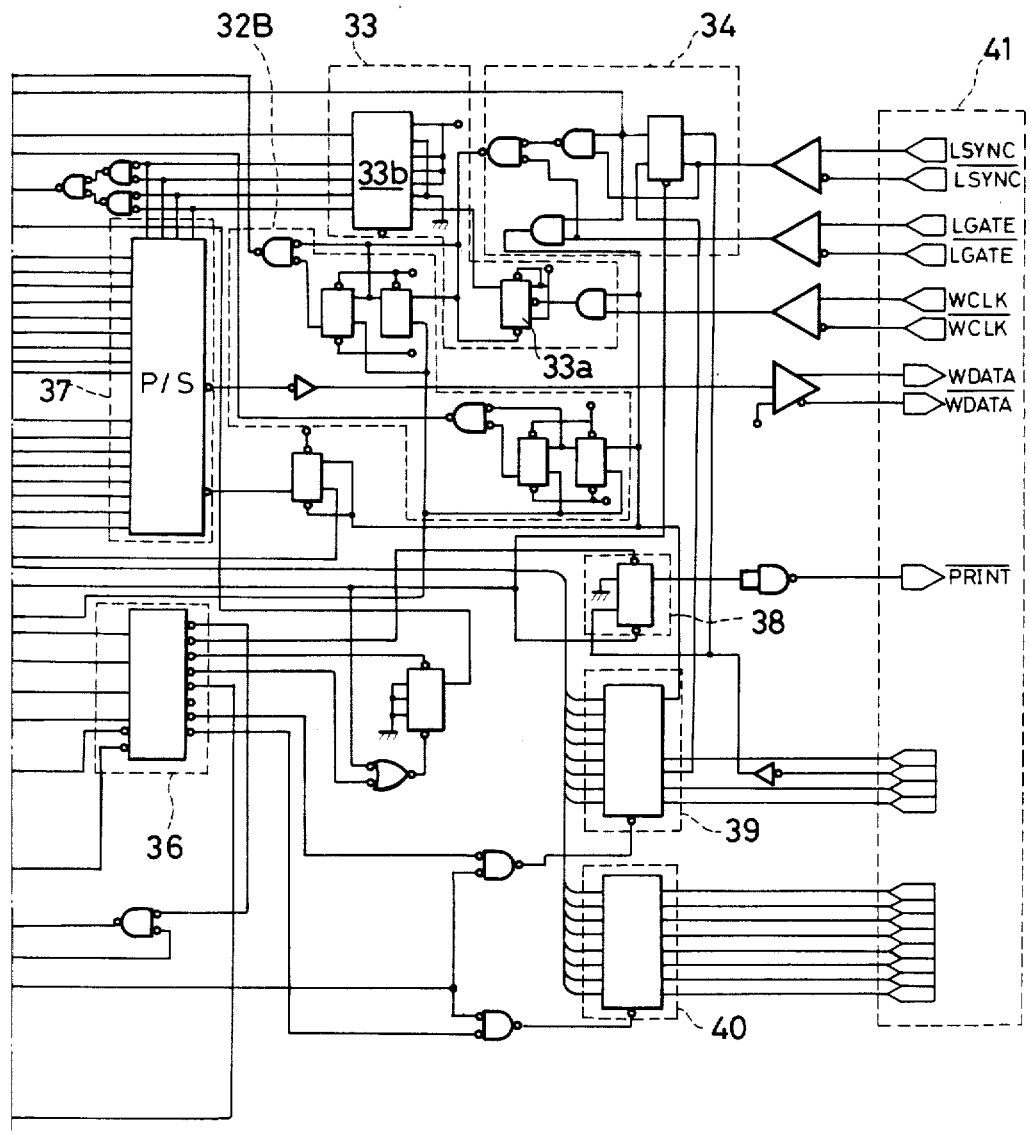

FIGS. 4a and 4b, when combined as indicated in FIG. 4, show the detailed structure of the printer interface circuit 29 shown in FIG. 3. As shown, the bus interface 31 includes a number of connectors for connection with the system bus 30 of the host system 10. The DMA controller 32 is shown in two parts, i.e., 32A and 32B, and it includes flip-flops and logic gates. Since the structure and function of DMA is well known in the art, it will not be described in detail here. The data latch 35, in fact, includes four latches 35a through 35d in the illustrated embodiment. The latches 35a and 35b constitute a first stage and receive 16-bit data from the host system 10 in parallel. The other latches 35c and 35d define a second stage and they are connected in parallel with the latches 35a and 35b, respectively. Thus, the data stored in the first stage latches 35a and 35b is presented for printing upon printing of the data stored in the second stage latches 35c and 35d. The address decoder 36, latch 38, and status inputs 39 and 40 are comprised of appropriate I.C. chips. The status inputs 39 and 40 stores various operating conditions of the laser printer 3.

Figure 5:
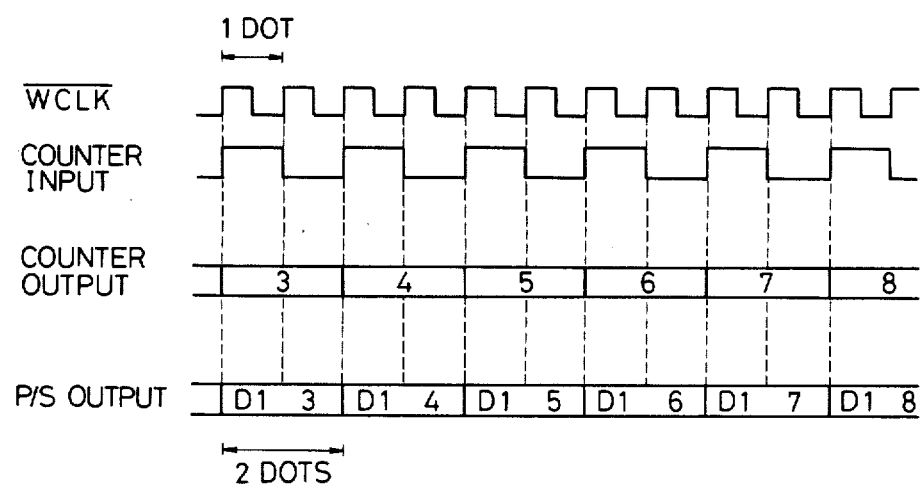
FIG. 5 is a timing chart which is useful for explaining the operation of the printer interface circuit shown in FIGS. 4a and 4b.

The expansion circuit 33 includes a JK flip-flop 33a which is connected to receive the laser clock signal $\overline{WCLK}$ as its input through an AND gate. Thus, as shown in FIG. 5, the flip-flop 33a supplies a clock output signal which is twice the period of or half the frequency of the laser clock signal $\overline{WCLK}$. This modified clock signal is then supplied to a counter 33b whose four output lines are connected to the P/S converter 37 so that one of the 16 input lines of the P/S converter 37 is selected sequentially, thereby converting the parallel data stored in the second stage latches 35c and 35d into the serial print data WDATA. It is thus clear that the time period of the laser clock signal $\overline{WCLK}$ is expanded twice by the JK flip-flop 33a and the print data is serially supplied to the laser printer 3 in accordance with this modified clock signal, or at half the frequency of $\overline{WCLK}$. As a result, the same data is supplied twice for the two consecutive clock pulses in the clock signal $\overline{WCLK}$ at the laser printer 3, so that the data is expanded twice in the horizontal direction. It is to be noted, however, that the data may be expanded by any desired factor depending on the particular structure of the expansion circuit 33. Accordingly, when the data stored in the bit map memory 28 in the host system 10 is to be printed as supplied through the present printer interface circuit 29, the data is expanded twice in the horizontal direction.

Figure 6:
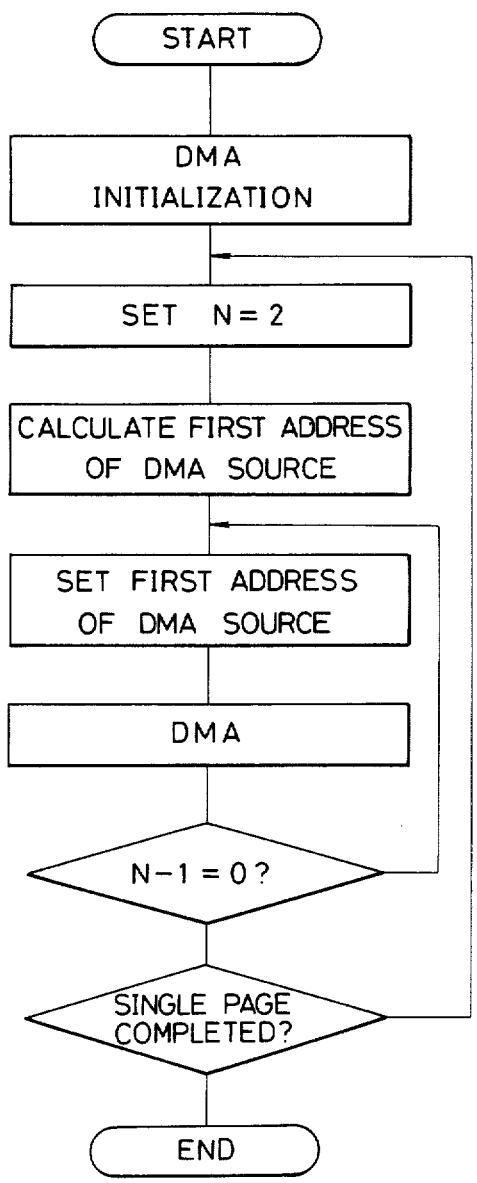
FIG. 6 is a flow chart which is useful for explaining how the data is expanded vertically by means of software in accordance with the present invention.

In the present embodiment, the host system stores a software program which allows to expand the data stored in the bit map memory 28 in the vertical direction by the same factor as provided by the printer interface circuit 29 so as to maintain the original characteristic of the data when printed. Such a program may be stored, for example, in the hard disc drive 27, and the CPU 11 carries out the transfer of data in the bit map memory 28 to the printer interface circuit 29 in accordance with such a program. The software program for expanding the data in the bit map memory 28 twice in the vertical direction is illustrated in FIG. 6 in the form of a flow chart. As may be easily seen from the sequence of steps shown in the flow chart of FIG. 6, this program supplies the data for a single print line twice, thereby expanding the data twice in the vertical direction. It is to be noted, however, that the degree of expansion in the vertical direction by software may be appropriately determined in relation to the degree of expansion in the horizontal direction by hardware, i.e., printer interface circuit 29, and it is preferable that the degree of expansion is the same both for horizontal and vertical directions so as to maintain the original characteristic of the data when printed. It should also be noted that the degree of expansion may also be unity, in which case no expansion of data takes place but the data can be directly supplied from the host system 10 to the laser printer 3 through the printer interface circuit 29.

As described in detail, in accordance with the present invention, since a printer interface circuit is provided in the host system, a printer may be directly connected to the host system. Such a structure is particularly advantageous when a printer having its own clock signal for its printing operation is to be connected to the host system because the printer interface circuit functions as a buffer to provide synchronization between the host system and the printer. Moreover, when a page printer, such as a laser printer, is to be connected to the host system, the present invention allows to use a bit map memory of small capacity because the printer interface circuit can expand the data suitably. For example, even if the page printer connected to the host system requires 1 M-byte bit map memory for its printing operation, the present invention allows to use a bit map memory of 256 K-byte capacity in the host system if the host system is so structured to expand the data twice horizontally as well as vertically as described above. It should also be noted that the present invention obviates the necessity to provide a character generator for exclusive use by the printer. It should also be noted that the present invention may also be used for line printers, such as wire-dot, thermal and ink-jet printers, in which case, the provision of a bit map memory is not necessary and a memory for storing a single print line is sufficient.

While the above provides a full and complete disclosure of the preferred embodiments of the present invention, various modifications, alternate constructions and equivalents may be employed without departing from the true spirit and scope of the invention. Therefore, the above description and illustration should not be construed a limiting the scope of the invention, which is defined by the appended claims.

What is claimed is:

1. A printer interface circuit for interfacing a host system which generates a first clock signal and a printer which generates a second clock signal, wherein said printer is outside of said host system but is connected thereto, comprising:

first storing means in said host system for storing data to be printed and second storing means also in said host system, said data to be printed being transferred from said second into said first storing means in said host system in accordance with said first clock signal; and transferring means which also is a part of said host system, for transferring said data thus stored in said first storing means to said printer at a rate controlled by said second clock signal, which is generated by said printer, said host system being coupled with said printer to receive said second clock signal therefrom and to transfer data from said first storing means thereto.

2. The circuit of claim 1 wherein said first storing means receives said data of predetermined number of bits in parallel, and said transferring means includes a parallel-to-serial converter for converting said parallel data into a serial data before being supplied to said printer at said clock rate determined by said second clock signal.

3. The circuit of claim 2 wherein said transferring means further includes an expansion circuit for outputting a modified clock signal in response to said second clock signal from said printer, said modified clock signal having a frequency which is an inverse of an integral multiple of a frequency of said second clock signal, and wherein said parallel-to-serial conversion takes place at a rate determined by said modified clock signal.

4. The circuit of claim 3 wherein said expansion circuit expands said data in a horizontal direction, and said host system contains a software program which causes said host system to supply data from said second storing means to said first storing means multiple times so as to expand, in a vertical direction, the data supplied to said first storing means.

5. The circuit of claim 3 wherein said expansion circuit includes a flip-flop which is connected to receive said second clock signal and to supply said modified clock signal which determines the rate of said parallel-to-serial conversion.

6. The circuit of claim 3 wherein said printer is a laser printer connected to said host system.

7. The circuit of claim 2 wherein said first storing means in the host system includes a data latch for receiving said data of predetermined number of bits from said second storing means in said host system and for supplying said data to said parallel-to-serial converter in parallel.

8. The circuit of claim 7 wherein said data latch in the host system includes at least two latches to define a two-state structure.

* * * * *